United States Patent
Bourgeois et al.

(10) Patent No.: US 11,227,698 B2
(45) Date of Patent: Jan. 18, 2022

(54) METHOD FOR IDENTIFYING THE UNIT CAUSING A RAW WATER LEAK IN A CONDENSER OF A THERMAL POWER PLANT

(71) Applicant: Electricite de France, Paris (FR)

(72) Inventors: Christophe Bourgeois, Rochegude (FR); Estelle Rioury, La Garde Adhemar (FR)

(73) Assignee: Electricite de France

( * ) Notice: Subject to any disclaimer, the term of this patent is extended or adjusted under 35 U.S.C. 154(b) by 0 days.

(21) Appl. No.: 16/772,352

(22) PCT Filed: Dec. 14, 2018

(86) PCT No.: PCT/EP2018/085039
§ 371 (c)(1),
(2) Date: Mar. 9, 2021

(87) PCT Pub. No.: WO2019/115799
PCT Pub. Date: Jun. 20, 2019

(65) Prior Publication Data
US 2021/0272711 A1    Sep. 2, 2021

(30) Foreign Application Priority Data
Dec. 15, 2017 (FR) .................... 1762199

(51) Int. Cl.
| | |
|---|---|
| *G21C 19/30* | (2006.01) |
| *B01J 49/07* | (2017.01) |
| *B01J 39/05* | (2017.01) |
| *B01J 49/53* | (2017.01) |
| *B01J 41/07* | (2017.01) |
| *B01J 49/06* | (2017.01) |
| *B01J 47/02* | (2017.01) |
| *G21C 17/02* | (2006.01) |
| *B01J 49/57* | (2017.01) |
| *B01J 47/022* | (2017.01) |
| *G21C 17/022* | (2006.01) |

(52) U.S. Cl.
CPC .............. *G21C 19/30* (2013.01); *B01J 39/05* (2017.01); *B01J 41/07* (2017.01); *B01J 47/022* (2013.01); *B01J 49/06* (2017.01); *B01J 49/07* (2017.01); *B01J 49/53* (2017.01); *B01J 49/57* (2017.01); *G21C 17/0225* (2013.01)

(58) Field of Classification Search
CPC ...... G21C 19/30; G21C 17/0225; B01J 39/05; B01J 41/07; B01J 47/022; B01J 49/06; B01J 49/53; B01J 49/57; B01J 49/07
USPC .......................................................... 376/308
See application file for complete search history.

(56) References Cited

U.S. PATENT DOCUMENTS

| | | | | |
|---|---|---|---|---|
| 6,293,104 B1 * | 9/2001 | Kangai | ................... | F28B 11/00 60/645 |
| 6,655,144 B2 * | 12/2003 | Kangai | ................... | F28B 11/00 60/645 |
| 6,686,751 B1 * | 2/2004 | Saito | ................... | G01N 27/06 204/263 |

FOREIGN PATENT DOCUMENTS

| | | | |
|---|---|---|---|
| DE | 2951865 | A1 | 7/1981 |
| EP | 0013528 | A1 | 7/1980 |
| JP | H1147560 | A | 2/1999 |
| JP | 2005257626 | A | 9/2005 |
| JP | 2008190933 | A | 8/2008 |
| JP | 2010216823 | A * | 9/2010 |
| JP | 2013250278 | A * | 12/2013 |
| JP | 2018054359 | A * | 4/2018 |

OTHER PUBLICATIONS

International Search Report for Application No. PCT/EP2018/085039 dated Jan. 21, 2019, 2 pages.

* cited by examiner

*Primary Examiner* — Michael M. Bernshteyn
(74) *Attorney, Agent, or Firm* — Lerner, David, Littenberg, Krumholz & Mentlik, LLP (57) ABSTRACT

The present invention relates to a method for identifying the unit causing a raw water leak in a condenser of a thermal power plant consisting of n units.

20 Claims, 6 Drawing Sheets

METHOD FOR IDENTIFYING THE UNIT CAUSING A RAW WATER LEAK IN A CONDENSER OF A THERMAL POWER PLANT

CROSS-REFERENCE TO RELATED APPLICATIONS

The present application is a national phase entry under 35 U.S.C § 371 of International Application No. PCT/EP2018/085039 filed Dec. 14, 2018, which claims priority from French Application No. 1762199 filed Dec. 15, 2017, all of which are hereby incorporated herein by reference.

The present invention relates to a method for identifying the unit causing a raw water leak in a condenser consisting of several units.

It finds application in industrial plants with a steam production circuit and a cooling circuit using a condenser, including thermal power plants such as nuclear power plants or fossil fuel power plants.

In general, the water that feeds the cooling circuit of such a plant comes directly from a river or the sea. It is so-called raw water, as opposed to the purified water employed in other circuits.

Figure 1:
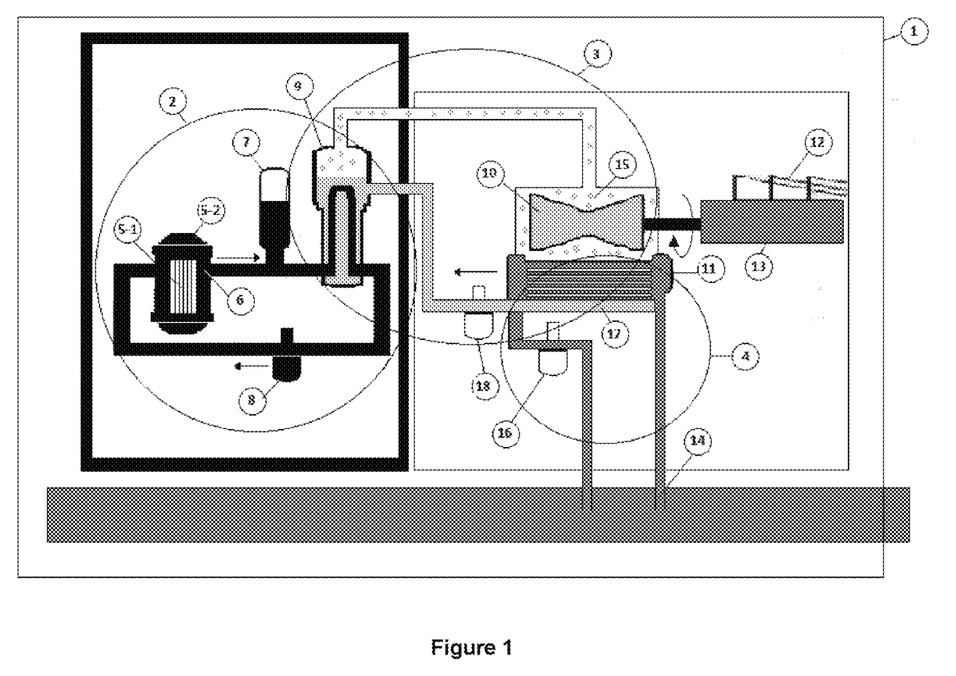
FIG. 1: simplified representation of a pressurized-water nuclear power plant.

A nuclear power plant (1), for example, consists of three separate circuits (FIG. 1):

The primary circuit (2) is the heat producing source, thanks to a pressurized water reactor (5-1) enclosed in a vessel (5-2). The water (6) that flows through the reactor vessel is heated to a high temperature, around 310° C. A pressurizer (7) is used to establish a pressure of about 155 bar so that the water remains in the liquid state. After passing through the steam generator (9) to release its heat, the water is recirculated by a pump (8) and heated again in the vessel (5-2). This primary circuit thus forms a closed loop. Depending on the power and the series of the nuclear power plant, its primary circuit may consist of several loops. However, it has only a single reactor (5-1) and a single pressurizer (7).

The secondary circuit (3) recovers the steam (15) produced by the steam generators (9) of the loops of the primary circuit (2) to drive a set of turbines (10) to produce electricity (12) via an alternator (13).

The tertiary circuit (4), also known as the cold source circuit (14), ensures the cooling of the steam (15) at the condensers (11), so as to obtain water in a liquid state, the condensate (17), which returns to the steam generator (9) by the action of the pump (18). This cooling circuit is supplied with raw water by the pump (16).

On the other hand, in order to guarantee the longevity of such a plant, it is important to preserve the quality of the water circulating in the primary (2) and secondary (3) circuits, and therefore to avoid any entry of raw water and the pollutants it contains into those circuits. In particular, $Na^+$, $Ca^{2+}$ and $Cl^-$ ions are considered to be pollutants in that they are likely to cause corrosion.

An entry of raw water into a steam generator (9) of the secondary circuit can be extremely disadvantageous for the plant operator.

Figure 2:
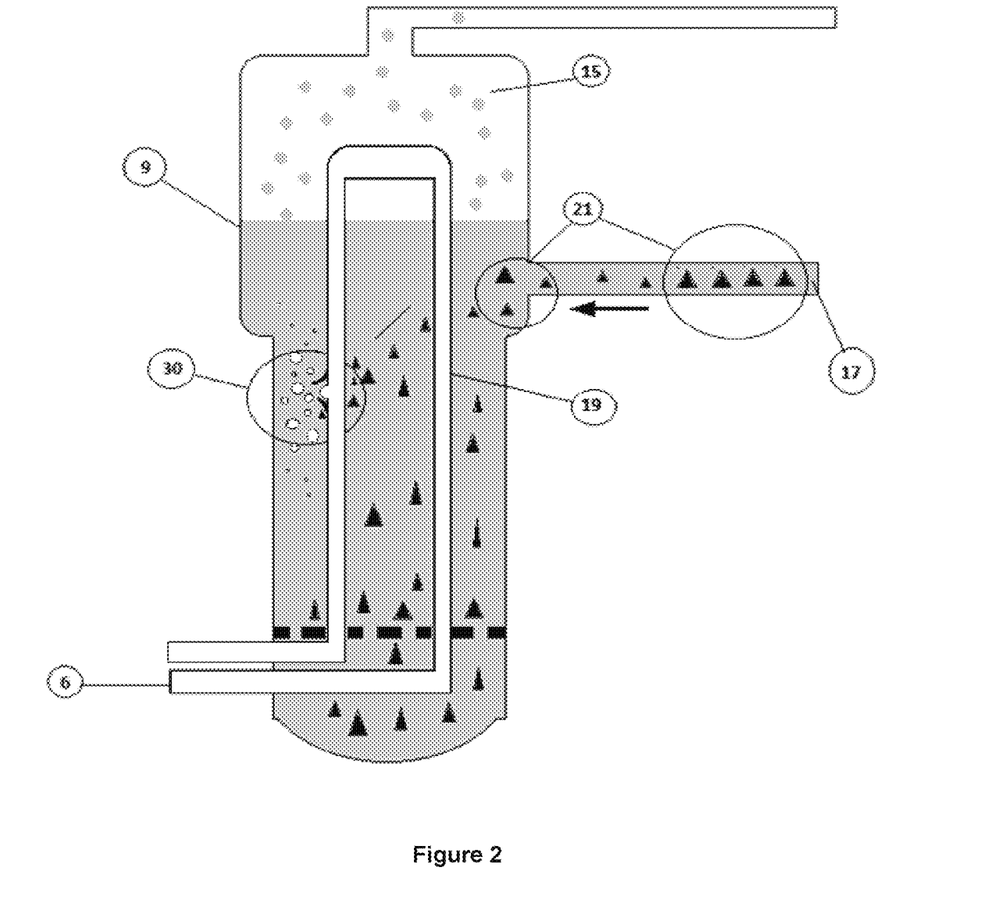
FIG. 2: schematic representation of a steam generator.

Indeed, as shown in detail in FIG. 2, it results in the intrusion of impurities (21), such as $Na^+$, $Ca^{2+}$ and/or $Cl^-$, which, due to their low volatility, tend to concentrate in the liquid phase. This concentration phenomenon can generate localized corrosion which damages the steam generator tubes (19), within which the water (6) of the primary circuit circulates, and can eventually lead to puncture (30). Due to the pressure gradient between the primary (155 bar) and secondary (70-80 bar) circuits, such punctures lead to a leakage of potentially radioactive water into the water of the secondary circuit, located in an area of the plant that is not supposed to be exposed to radioactive risks. This incident is considered significant according to the scale established by the Nuclear Safety Authority and, as such, leads to an immediate and prolonged shutdown of the nuclear reactor, with the obligation to repair and decontaminate the secondary circuit. This results in a significant loss of production for the operator. In addition, pollution by raw water can lead to widespread corrosion in other parts of the secondary circuit, thus limiting the service life of the affected components.

It is therefore imperative to monitor and detect any raw water infiltration in order to prevent the risks previously listed.

The steam generator is thus equipped with a purification circuit known as SPG (supply, purge, steam generator), which has a dual function. The first role of this purge circuit, composed of filters and cationic and anionic demineralizers, is to clean the condensates before reinjecting the water into the secondary circuit. The other function of the SPG circuit is to make a direct measurement of the pollutants present in the steam generator using conductivity meters associated with cationic resins and sodium meters. It thus enables the detection of raw water entering the tertiary circuit from the condenser.

A condenser of a pressurized-water power plant is subdivided into several identical units. At present, the condensers used in French nuclear power plants are typically composed of 3 to 8 units. Each unit corresponds to an elementary condenser (31) (FIG. 3) operating as a single, autonomous condenser within which heat exchange takes place between, on the one hand, the steam (15) to be condensed produced by the steam generator and, on the other, the liquid water from the cold water source, raw water (14) at atmospheric pressure. The secondary part of the condenser (32), consisting of the tubes (33) in which the steam circulates, is kept under vacuum so as to promote the condensation of the steam and thus increase the thermal efficiency of the plant. These tubes being in direct contact with the raw cooling water are susceptible to corrosion which can cause a puncture (34) and thus, due to the pressure gradient, an entry of raw water into the secondary circuit, which mixes with the condensate (17) which feeds the steam generator (9).

Figure 3:
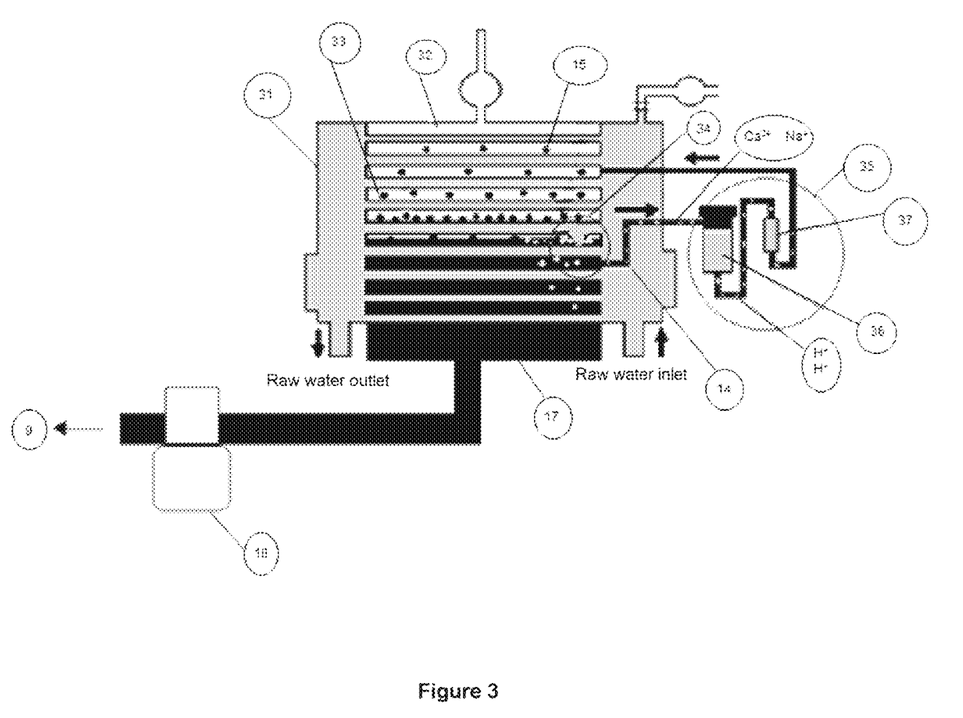
FIG. 3: schematic representation of an elementary condenser unit, associated with its detection system consisting of a cation-exchange resin and a conductivity meter.

Conventionally, each condenser unit is equipped with a water quality monitoring system (35) to detect raw water infiltration into the condensate. For this purpose, a sample of the condensate is tapped for analysis in the device consisting of an ion-exchange resin (36) and a conductivity meter (37). If, for example, raw river water has entered the condenser tubes, the condensate sample contains, in particular, $Na^+$ and $Ca^{2+}$ ions, which will be captured by the cationic resin and thus cause the departure of $H^+$ ions which will increase the conductivity of the water. The measurement of the cationic conductivity of the water after it has passed over the ion-exchange resin through the conductivity meter is proportional to the concentration of $Na^+$ and $Ca^{2+}$ ions in the condensate. This method of pollutant detection is described in document EP0013528.

The identification of the condenser unit causing a raw water leak based on the principle of cationic conductivity measurement was effective when the condensers were made of copper. Indeed, these condensers were subject to significant corrosion, causing entries of sufficient volumes of raw water to be detected by such a method.

In recent years, however, more and more power plants have been equipped with stainless-steel condensers, which are less prone to corrosion. As a result, raw water leaks, when they do occur, are much less significant than with copper condensers, so that the conventional monitoring system consisting of an ion-exchange resin and a conductivity meter is no longer sensitive enough to detect them.

Although small, these raw water infiltrations must nevertheless be identified in order to prevent the risks posed by corrosion. A palliative protocol has therefore been put in place, described below.

The detection of an entry of raw water from the conductivity and sodium parameters measured at the steam generator via its SPG circuit remains possible. Indeed, due to the concentration phenomenon, impurities are present in sufficient amount to be detected by this monitoring system. When an anomaly is found in the measurements made in the SPG circuit, it is first necessary to validate the diagnosis of raw water infiltration from the condenser by eliminating other possible sources of pollution.

Next, the operator successively isolates the plant's individual condenser units. When the unit causing the leak is isolated, the parameters measured by the SPG circuit return to their normal value. This protocol thus makes it possible to identify the faulty unit.

The major disadvantage of this method is that the isolation of a condenser unit reduces the overall heat-exchange surface of the condenser and therefore requires adjusting the flow rate of the secondary circuit by lowering the reactor power, which results in production losses.

Furthermore, since the SPG circuit is relatively remote from the condenser, where the raw water entry occurs, other sources of pollution from plant components located between the condenser and the steam generator may impact the SPG circuit parameters on which the diagnosis is based. Thus, these parasitic pollutions can induce an erroneous diagnosis.

It is therefore important to develop an alternative procedure for determining the origin of raw water infiltration, without the need to isolate the condenser units one by one in order to avoid the drop in load inherent in such a protocol. To this end, a measurement method should be proposed which can be implemented directly at the level of the condensers, furthermore making it possible to detect leaks early and thus avoid the development of corrosion in the secondary circuit.

The difficulty lies in the fact that the punctures that can occur on a stainless-steel condenser are small and therefore the corresponding raw water leakage is very small.

In the nuclear power plants currently operating in France, such a leak is typically of the order of 1 to 2 L/h. The water flow rate in the condenser being roughly 700 to 800 m$^3$/h, the leak is therefore diluted by a factor of 700 000 to 800 000.

The average concentration of the preponderant ion in the cooling water used at the site of the development of the invention, $Ca^{2+}$, is of the order of 50 ppm (50 mg/L). The amount to be measured is therefore theoretically about 0.07 µg/L. The most sensitive detection means currently available, such as atomic absorption spectrometry, make it possible to measure values of the order of 1 ppb (1 µg/L), which represents a value more than 14 times higher than the theoretical concentration that a leak in a stainless-steel condenser can generate.

The inventors of the present invention have nevertheless succeeded in developing a method enabling a reliable and direct identification of the stainless-steel condenser unit at the origin of a low entry of raw water into a steam generator of a thermal power plant, without the need to successively isolate the condenser units from the plant.

The method forming the subject matter of the present invention is based on the concentration of ions present in the raw water by trapping in a column containing an ion-exchange resin, each condenser box being provided with its own column.

The nature of the ion-exchange resin depends on the origin of the raw water that feeds the condenser cooling circuit:

in the case of river water, the ions capable of causing corrosion are $Na^+$ and $Ca^{2+}$ ions, which can be trapped by a suitable cationic resin;

in the case of sea water, the ions capable of causing corrosion are $Cl^-$ ions, which can be trapped by a suitable anionic resin.

When a certain amount of water has circulated through the column, the resin is collected and the fixed ions are released by elution with an acidic (respectively basic) solution, further allowing regeneration of the cationic (respectively anionic) resin.

It is then possible to determine the concentration of ions capable of causing corrosion in the condensate that has circulated through the column of a given condenser unit by a spectroscopic method.

By comparing the concentrations determined for each of the units, it is possible to identify which one is failing.

This protocol can be applied as soon as a predetermined threshold or an abnormal evolution of the parameters measured in the SPG circuit of the steam generator is observed. It can be implemented with the unit on or unit off.

In order to obtain, after elution of the resin, an amount of ions detectable by existing spectroscopic methods, the inventors carried out work to resize the volume of resin used compared with those used in the traditional method of measuring cationic conductivity. The volume of condensate eluted into the resin also affects the amount of ions obtained after elution.

Furthermore, surprisingly, it proves that the direct use of new commercial resins did not lead to the identification of the failed condenser unit. Thus, the method forming the subject matter of the present invention requires a preliminary treatment step of the ion-exchange resin before the protocol is implemented.

The present invention therefore relates to a method for identifying the unit causing a leak of raw cooling water in a condenser of a thermal power plant consisting of n units, n being an integer comprised between 2 and 15, preferably between 3 and 8, wherein each of the n units is equipped with a cartridge intended to contain an ion-exchange resin in a volume comprised between 50 and 150 mL, advantageously between 80 and 120 mL, comprising the following steps:
a) for each of the n units, purifying the ion-exchange resin to be placed in the cartridge;
b) for each of the n units, placing the purified ion-exchange resin obtained at the end of step a) in the cartridge;
c) for each of the n units, passing a volume of condensate comprised between 500 and 1 500 L, advantageously between 800 and 1 200 L, into the cartridge containing the purified ion-exchange resin put in place in step b);
d) for each of the n units, collecting the ion-exchange resin obtained at the end of step c);

e) for each of the n units, regenerating the ion-exchange resin collected in step d) by elution with an aqueous regeneration solution;

f) for each of the n units, collecting the eluate obtained at the end of step e) followed by determining the nature of the ionic species present in said eluate and the amount of each ionic species present in said eluate; and g) for each of the ionic species identified in step f), comparing the amounts of said ionic species determined in each of the n eluates.

For the purposes of the present invention, "raw cooling water" means the cold source that feeds the condenser, which consists of unpurified river or sea water.

A "condenser unit" means, for the purposes of the present invention, an elementary condenser, it being understood that the condenser of a thermal power plant is compartmentalized into several identical elementary condensers.

For the purposes of the present invention, "condensate" means water in the liquid state resulting from the condensation of water vapor from the steam generator. Said condensate may also contain raw cooling water as a result of infiltration following a puncture in a condenser tube, said puncture may in particular result from a corrosion phenomenon. Pollutants are then present in the condensate which are likely to cause corrosion.

An "ion-exchange resin" is a solid material generally in the form of beads composed of a "polymer matrix" on which are grafted positively or negatively charged functional groups that will allow an "ion exchange".

The "polymer matrix" according to the invention may be gel-type or macroporous, advantageously gel-type.

It may in particular be a matrix of polystyrene, polystyrene-divinylbenzene copolymer or cross-linked polyacrylate.

The average diameter of the resin beads according to the invention is comprised between 0.2 mm and 1.2 mm, notably between 0.3 mm and 0.8 mm, in particular between 0.4 mm and 0.7 mm.

The resin beads according to the invention are further characterized by a uniformity coefficient less than or equal to 1.8, in particular less than or equal to 1.5, preferably less than or equal to 1.2.

"Ion exchange" is a process in which ions of a certain charge contained in a solution are removed from that solution by adsorption onto a solid material, the ion exchanger, to be replaced by an equivalent amount of other ions of the same charge emitted by the solid.

A distinction is made between cationic and anionic resins.

A "cationic resin" has negatively charged functional groups. When an aqueous solution containing ions is circulated over such a resin, the cations initially present as counterions to the functional groups in order to ensure the electroneutrality of the resin are gradually replaced by the cations present in the eluent solution until the resin is saturated.

Figure 4:
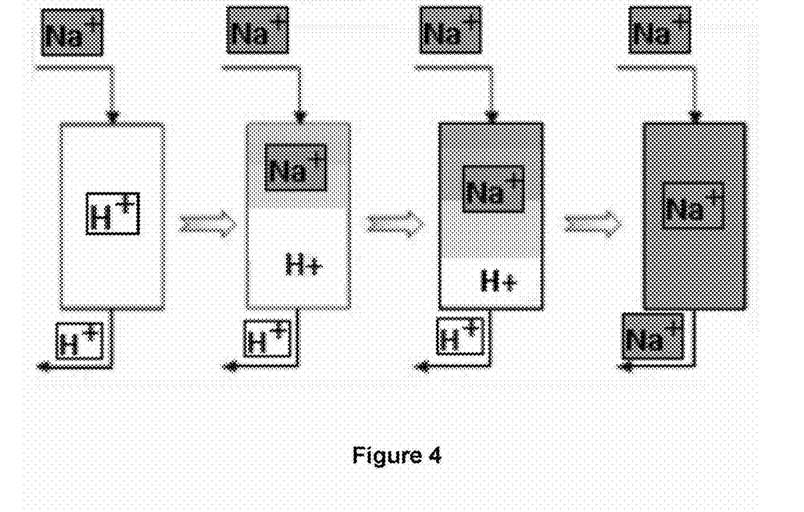
FIG. 4: Schematic representation of the saturation of a cation-exchange resin with $Na^+$ ions.

The progressive saturation of a cationic resin initially containing $H^+$ ions by exchange with $Na^+$ ions is shown in FIG. 4.

An "anionic resin" has positively charged functional groups, with the understanding that it may be a partial charge. When an aqueous solution containing ions is circulated over such a resin, the anions initially contained in the resin will gradually be replaced by the anions present in the eluent solution, until the resin is saturated.

The "exchange capacity" of an ion-exchange resin, expressed in equivalents per liter, is the capacity to retain ions until the resin is saturated.

Its "total exchange capacity" corresponds to the equivalent concentration of functional groups, and thus the number of monovalent exchangeable ions per unit volume.

An ion-exchange resin according to the invention has a total exchange capacity greater than 1.0 eq/L, preferably greater than 1.5 eq/L, advantageously greater than 2.0 eq/L.

A saturated ion-exchange resin can be regenerated by elution using a "regeneration solution" containing ions of the same charge as those adsorbed on the resin.

Figure 5:
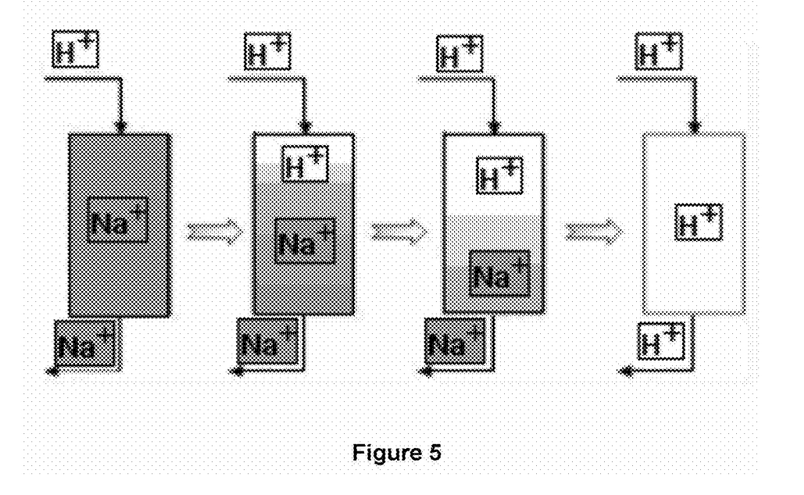
FIG. 5: Schematic representation of the regeneration of a cation-exchange resin.

The "regeneration" of a cationic resin can be carried out using an aqueous regeneration solution consisting of a solution of a mineral acid, preferably a strong acid ($pK_a \leq 0$), such as hydrochloric acid, nitric acid or sulfuric acid. The gradual regeneration of a cationic resin saturated with $Na^+$ ions is shown in FIG. 5.

The regeneration of an anionic resin can be carried out using an aqueous regeneration solution consisting of an aqueous solution of a base, preferably a strong base ($pK_a \geq 14$), such as soda.

An ion-exchange resin can be selective for certain ions, i.e. preferentially fix certain ions.

For the purposes of the present invention, "purification of the ion-exchange resin" means an elution process to remove impurities from the resin.

Case of Raw River Water

When the cooling circuit is fed with river water, the pollutants capable of causing corrosion include $Na^+$ and $Ca^{2+}$ ions.

The "ion-exchange resin" used in the method according to the invention then consists of a cationic resin.

The resin is then in the form of polymer beads, in particular polystyrene or polystyrene-divinylbenzene copolymer, on which negatively charged cation-exchange functional groups are grafted.

The resin preferably has a high affinity for $Na^+$ and $Ca^{2+}$ ions. Advantageously, the resin is selective for $Na^+$ and $Ca^{2+}$ ions.

It can be a strongly acidic cationic resin with, for example, $SO_3^-$ groups as exchange functional groups or a weakly acidic cationic resin with, for example, $CO_2^-$ groups as exchange functional groups. Advantageously, it is a strongly acidic resin.

In a particular embodiment, the ion-exchange resin is a strongly acidic cationic resin, which consists of polystyrene or polystyrene-divinylbenzene copolymer beads on which are grafted $SO_3^-$ groups and having a uniformity coefficient less than or equal to 1,8, in particular less than or equal to 1.5, preferably less than or equal to 1.2, the total exchange capacity of the resin being greater than 1.0 eq/L, preferably greater than 1.5 eq/L, advantageously greater than 2.0 eq/L.

Advantageously, the counterions of the $SO_3^-$ groups initially present in the resin before the implementation of the method forming the subject matter of the present invention are $H^+$ ions. In particular, prior to the implementation of the method forming the subject matter of the present invention, at least 99% of the $SO_3^-$ groups have an $H^+$ ion as counterion.

Advantageously, prior to the implementation of the method forming the subject matter of the present invention, the concentration of $Na^+$ ions in the resin is less than 100 ppm, preferably less than 70 ppm, preferentially less than 50 ppm.

Advantageously, prior to the implementation of the method forming the subject matter of the present invention, the concentration of $Ca^{2+}$ ions in the resin is less than 100 ppm, preferably less than 70 ppm, preferentially less than 50 ppm.

Advantageously, prior to the implementation of the method forming the subject matter of the present invention, the concentration of each of the cations present in the resin is less than 100 ppm, preferably less than 70 ppm, preferentially less than 50 ppm.

The cationic resin may in particular be a resin specially intended for nuclear use.

Thus, the cationic resin can advantageously be selected from the resins Amberlite IRN97 H, IRN77 and IRN99 marketed by Dow and the resins Purolite NRW1000, NRW1100, NRW1160, NRW1180 and NRW160 marketed by Purolite.

In particular, the cationic resin can be the resin Amberlite IRN97 H.

As mentioned above, it is necessary to proceed during step a) of the method according to the invention to the purification of the cationic resin intended to be placed in the cartridge which equips each condenser unit.

Purification is carried out by elution using an acidic solution, preferably a strong acid, such as hydrochloric acid, nitric acid or sulfuric acid.

The mass percentage of the acid in solution is comprised between 1 and 50%, notably between 5 and 30%, in particular between 10 and 20% by weight relative to the total weight of the solution.

The elution operation consists in pouring onto the resin a volume of acidic solution at least 2 times as large, in particular at least 4 times as large, advantageously at least 5 times as large as the volume of resin.

Advantageously, the acidic purification solution has an $Na^+$ ion concentration of less than 1 ppb, notably less than 0.5 ppb, in particular less than 0.2 ppb.

Advantageously, the acidic purification solution has a $Ca^{2+}$ ion concentration of less than 1 ppb, notably less than 0.5 ppb, in particular less than 0.2 ppb.

Advantageously, each cation present in the acidic purification solution has a concentration of less than 1 ppb, notably less than 0.5 ppb, in particular less than 0.2 ppb.

In a preferred embodiment, after the purification step a), the concentrations of $Na^+$ and $Ca^{2+}$ ions in the resin are less than 1 ppb, notably less than 0.5 ppb, in particular less than 0.2 ppb.

In step c) of the method according to the invention, the $H^+$ ions present in the purified cationic resin obtained at the end of step a) and placed in step b) are exchanged with the $Na^+$ and/or $Ca^{2+}$ ions of the condensate until the resin is saturated.

Step e) of regenerating the cationic resin can be carried out by elution using an aqueous regeneration solution consisting of a solution of a mineral acid, preferably a strong acid such as hydrochloric acid, nitric acid or sulfuric acid.

The mass percentage of the acid in the regeneration solution is comprised between 1 and 50%, notably between 5 and 30%, in particular between 10 and 20% by weight relative to the total weight of the solution.

In particular, elution consists in pouring onto the resin a volume of acidic solution at least 2 times as large, in particular at least 4 times as large, advantageously at least 5 times as large as the volume of resin.

Advantageously, the regeneration solution has an $Na^+$ ion concentration of less than 1 ppb, notably less than 0.5 ppb, in particular less than 0.2 ppb.

Advantageously, the regeneration solution has a $Ca^{2+}$ ion concentration of less than 1 ppb, notably less than 0.5 ppb, in particular less than 0.2 ppb.

Advantageously, each cation present in the regeneration solution has a concentration of less than 1 ppb, notably less than 0.5 ppb, in particular less than 0.2 ppb.

In step f) of the method according to the invention, the amounts of $Na^+$ and/or $Ca^{2+}$ ions present in the eluate obtained at the end of step e) are determined.

This measurement can be carried out by spectroscopic methods well known to the skilled person, such as atomic absorption spectroscopy.

Case of Raw Sea Water

When the cooling circuit is fed with river water, the pollutants capable of causing corrosion include $Cl^-$ ions.

The "ion-exchange resin" used in the method according to the invention then consists of an anionic resin.

The resin is then in the form of polymer beads, in particular polystyrene or polystyrene-divinylbenzene copolymer beads, on which anion-exchange functional groups are grafted.

Preferably, the resin has a high affinity for $Cl^-$ ions. Advantageously, the resin is selective for $Cl^-$ ions.

It may be a strongly basic anionic resin having $N(RR'R'')^+$ ammonium exchange functional groups, wherein R, R' and R'' are identical or different $(C_1-C_6)$alkyl groups.

It may be a weakly basic anionic resin having as exchanger functional groups amine groups NRR', wherein R and R' are identical or different $(C_1-C_6)$alkyl groups.

For the purposes of the present invention, a "$(C_1-C_6)$alkyl" group is a saturated, linear or branched hydrocarbon chain containing 1 to 6, preferably 1 to 4, carbon atoms. By way of example, mention may be made of methyl and ethyl groups.

In a particular embodiment, the ion-exchange resin is a strongly basic anionic resin, which consists of polystyrene or polystyrene-divinylbenzene copolymer beads on which ammonium groups are grafted, such as $N(CH_3)_3^+$ groups and having a uniformity coefficient less than or equal to 1.8, in particular less than or equal to 1.5, preferably less than or equal to 1.2, the total exchange capacity of the resin being greater than 1.0 eq/L, preferably greater than 1.5 eq/L, advantageously greater than 2.0 eq/L.

Advantageously, the counterions of the ammonium groups initially present in the resin before the implementation of the method forming the subject matter of the present invention are $HO^-$ ions. In particular, prior to the implementation of the method forming the subject matter of the present invention, at least 95% of the ammonium groups have a $HO^-$ ion as counterion.

Advantageously, prior to the implementation of the method forming the subject matter of the present invention, the concentration of $Cl^-$ ions in the resin is less than 100 ppm, preferably less than 70 ppm, preferentially less than 50 ppm.

Advantageously, prior to the implementation of the method forming the subject matter of the present invention, the concentration of each of the anions present in the resin is less than 100 ppm, preferably less than 70 ppm, preferentially less than 50 ppm.

The anionic resin may in particular be a resin specially intended for nuclear use.

Thus, the anionic resin can advantageously be chosen from the resin Amberlite IRN78 marketed by Dow and the resins Purolite NRW4000, NRW6000, NRW7000, NRW8000, NRW5010, NRW5050 and NRW5070 marketed by Purolite.

As mentioned above, it is necessary to proceed in step a) of the method according to the invention to the purification of the anionic resin intended to be placed in the cartridge which equips each condenser unit.

Purification is carried out by elution using a basic solution, preferably a strong basic solution, such as soda.

The mass percentage of the base in solution is comprised between 1 and 50%, notably between 5 and 30%, in particular between 10 and 20% by weight relative to the total weight of the solution.

The elution operation consists in pouring onto the resin a volume of basic solution at least 2 times as large, in particular at least 4 times as large, advantageously at least 5 times as large as the volume of resin.

Advantageously, the basic purification solution has a $Cl^-$ ion concentration of less than 1 ppb, notably less than 0.5 ppb, in particular less than 0.2 ppb.

Advantageously, each anion present in the basic purification solution has a concentration of less than 1 ppb, notably less than 0.5 ppb, in particular less than 0.2 ppb.

In step c) of the method according to the invention, the $HO^-$ ions present in the purified anionic resin obtained at the end of step a) and placed in step b) are exchanged with the $Cl^-$ ions of the condensate until the resin is saturated.

Step e) of regeneration of the anionic resin can be carried out by elution using an aqueous regeneration solution consisting of a basic solution, preferably a strong base such as soda.

The mass percentage of the base in the regeneration solution is comprised between 1 and 50%, notably between 5 and 30%, in particular between 10 and 20% by weight relative to the total weight of the solution.

In particular, elution consists in pouring onto the resin a volume of basic solution at least 2 times as large, in particular at least 4 times as large, advantageously at least 5 times as large as the volume of resin.

Advantageously, the regeneration solution has a $Cl^-$ ion concentration of less than 1 ppb, notably less than 0.5 ppb, in particular less than 0.2 ppb.

Advantageously, the regeneration solution has a $Cl^-$ ion concentration of less than 1 ppb, notably less than 0.5 ppb, in particular less than 0.2 ppb.

Advantageously, each anion present in the regeneration solution has a concentration of less than 1 ppb, notably less than 0.5 ppb, in particular less than 0.2 ppb.

In step f) of the method according to the invention, the amounts of $Cl^-$ ions present in the eluate obtained at the end of step e) are determined.

This measurement can be carried out by the spectroscopic methods well known to the skilled person.

The present invention is illustrated by the following non-limiting figures and examples.

EXAMPLES

Figure 6:
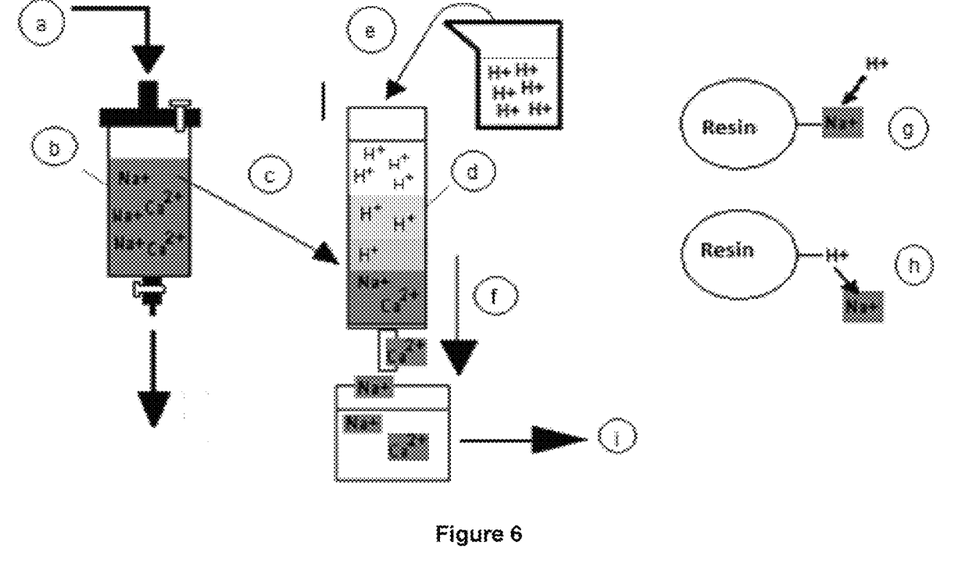
FIG. 6: Schematic representation of the steps implemented in the example described below.

Implementation of the Method According to the Invention:

The protocol described below was implemented on a nuclear power plant condenser consisting of 7 units, the cooling circuit of which is fed by raw river water containing $Na^+$ and $Ca^{2+}$ ions. The different steps are shown in FIG. 6.

The cationic resin used is amberlite IRN97 H.

A resin purification operation is carried out by pouring 500 mL of a hydrochloric acidic solution over 100 mL of resin. The solution used is a 15% dilution of Suprapur® hydrochloric acid marketed by Merck, the dilution being carried out with demineralized water having an $Na^+$ and $Ca^{2+}$ concentration of less than 1 ppb.

A cartridge containing 100 mL of previously purified cationic resin is placed on each condenser unit.

Water from the secondary circuit (a) is passed over the cartridge containing 100 mL of purified cationic resin, the cations contained in the water are retained on the resin (b). Once sufficient condensate has passed over the resin (about 1 $m^3$), the resin is recovered and transferred (c) to a laboratory glass column (d). The resin in the glass column is then eluted (acid is circulated over it) by a concentrated acidic solution containing $H^+$ ions (e). The $H^+$ ions will replace the fixed cations (g and h) on the resin. The cations thus removed (f) will be recovered and measured by a specific apparatus (i).

The elution operation consists of pouring 500 mL or more of acid over 100 mL of resin. The acidic solution used is the same as that used for the purification operation. The acid flows through the resin at a rate of one to two drops per second. The eluate is recovered from the resin in 100 mL fractions. Calcium is dosed onto each fraction collected by atomic absorption spectrometry.

These cations come from the known volume of condensate with which the resin was eluted. It is therefore possible to determine the concentration of $Ca^{2+}$ ions present in the condensate for each unit.

Figure 7A:
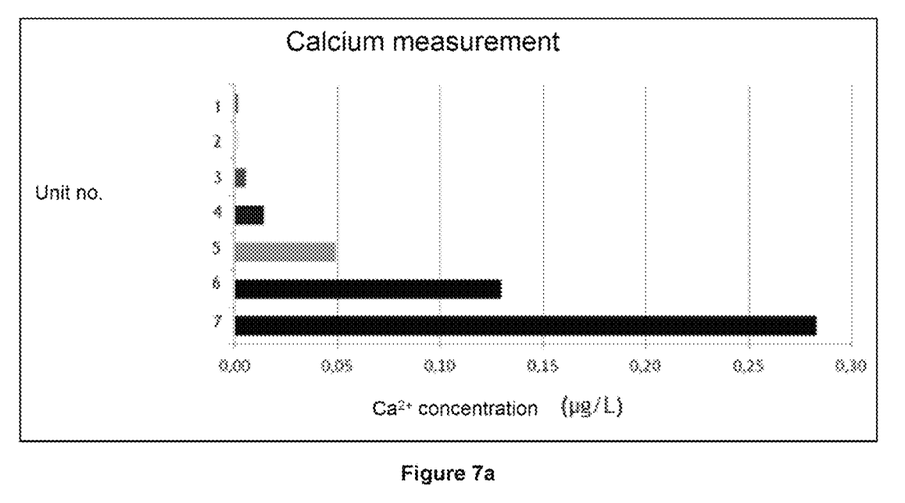
FIGS. 7a and 7b: Concentrations of $Ca^{2+}$ ions determined in the different units of a condenser in the examples described below, without carrying out a resin purification step (7b) or by carrying out the method according to the invention (7a).

The results obtained are shown in FIG. 7a.

Comparative Example

Figure 7B:
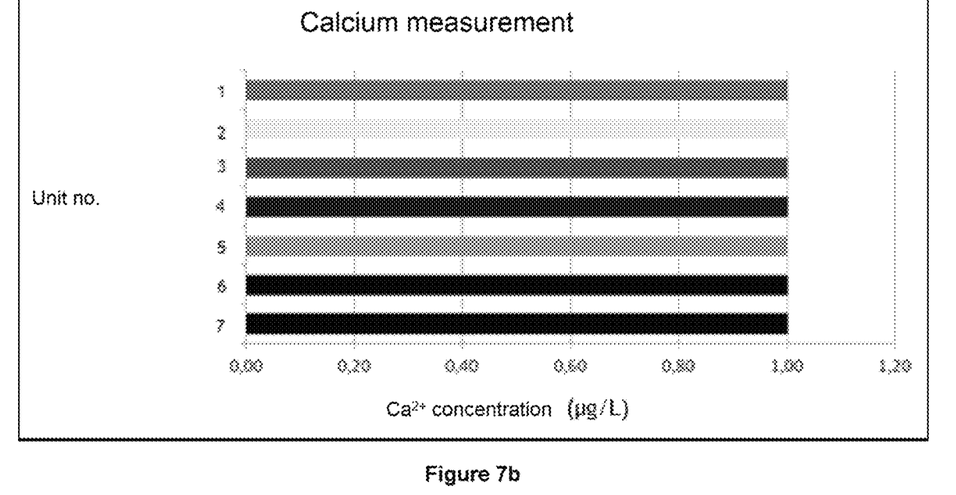

The same protocol is reproduced, without purifying the cationic resin. The results obtained are shown in FIG. 7b.

The invention claimed is:

1. A method for identifying the unit causing a raw water leak in a condenser of a thermal power plant consisting of n units,
   wherein n is an integer comprised between 2 and 15,
   wherein each of the n units is equipped with a cartridge intended to contain an ion-exchange resin in a volume comprised between 50 and 150 mL,
   comprising the following steps:
   a) for each of the n units, purifying the ion-exchange resin to be placed in the cartridge;
   b) for each of the n units, placing the purified ion-exchange resin obtained from step a) in the cartridge;
   c) for each of the n units, passing a volume of condensate comprised between 500 and 1500 L, into the cartridge containing the purified ion-exchange resin put in place in step b);
   d) for each of the n units, collecting the ion-exchange resin obtained at the end of step c);

e) for each of the n units, regenerating the ion-exchange resin collected in step d) by elution with an aqueous regeneration solution;
f) for each of the n units, collecting the eluate obtained at the end of step e) followed by determining the nature of the ionic species present in the eluate and the amount of each ionic species present in said eluate; and
g) for each of the ionic species identified in step f), comparing the amounts of the ionic species determined in each of the n eluates.

2. The method for identifying the unit causing a raw water leak in a condenser of a thermal power plant according to claim 1, wherein the ion-exchange resin has a total exchange capacity greater than 1.0 eq/L.

3. The method for identifying the unit causing a raw water leak in a condenser of a thermal power plant according to claim 1, wherein the raw water contains $Na^+$ and/or $Ca^{2+}$ ions, and the ion-exchange resin is a cationic resin.

4. The method for identifying the unit causing a raw water leak in a condenser of a thermal power plant according to claim 3, wherein step a) is carried out by elution of the cationic resin with a volume of acidic solution at least 2 times the volume of resin.

5. The method for identifying the unit causing a raw water leak in a condenser of a thermal power plant according to claim 4, wherein the acidic solution is a strong acidic solution which has a concentration of $Na^+$ and $Ca^{2+}$ ions of less than 1 ppb.

6. The method for identifying the unit causing a raw water leak in a condenser of a thermal power plant according to claim 3, wherein step e) is carried out by elution of the cationic resin with a volume of aqueous regeneration solution at least 2 times the volume of resin.

7. The method for identifying the unit causing a raw water leak in a condenser of a thermal power plant according to claim 6, wherein the aqueous regeneration solution is a strong acidic solution which has a concentration of $Na^+$ and $Ca^{2+}$ ions of less than 1 ppb.

8. The method for identifying the unit causing a raw water leak in a condenser of a thermal power plant according to claim 1, wherein the raw water contains $Cl^-$ ions, and the ion-exchange resin is an anionic resin.

9. The method for identifying the unit causing a raw water leak in a condenser of a thermal power plant according to claim 1, wherein n is an integer comprised between 3 and 8.

10. The method for identifying the unit causing a raw water leak in a condenser of a thermal power plant according to claim 1, wherein the cartridge is intended to contain an ion-exchange resin in a volume comprised between 80 and 120 mL.

11. The method for identifying the unit causing a raw water leak in a condenser of a thermal power plant according to claim 1, wherein in step c), the passed volume of condensate is comprised between 800 and 1 200 L.

12. The method for identifying the unit causing a raw water leak in a condenser of a thermal power plant according to claim 1, wherein the ion-exchange resin has a total exchange capacity greater than 1.5 eq/L.

13. The method for identifying the unit causing a raw water leak in a condenser of a thermal power plant according to claim 3, wherein step a) is carried out by elution of the cationic resin with a volume of acidic solution at least 4 times the volume of resin.

14. The method for identifying the unit causing a raw water leak in a condenser of a thermal power plant according to claim 3, wherein step a) is carried out by elution of the cationic resin with a volume of acidic solution at least 5 times the volume of resin.

15. The method for identifying the unit causing a raw water leak in a condenser of a thermal power plant according to claim 4, wherein the acidic solution is a strong acidic solution which has a concentration of $Na^+$ and $Ca^{2+}$ ions of less than 0.5 ppb.

16. The method for identifying the unit causing a raw water leak in a condenser of a thermal power plant according to claim 4, wherein the acidic solution is a strong acidic solution which has a concentration of $Na^+$ and $Ca^{2+}$ ions of less than 0.2 ppb.

17. The method for identifying the unit causing a raw water leak in a condenser of a thermal power plant according to claim 3, wherein step e) is carried out by elution of the cationic resin with a volume of aqueous regeneration solution at least 4 times the volume of resin.

18. The method for identifying the unit causing a raw water leak in a condenser of a thermal power plant according to claim 3, wherein step e) is carried out by elution of the cationic resin with a volume of aqueous regeneration solution at least 5 times the volume of resin.

19. The method for identifying the unit causing a raw water leak in a condenser of a thermal power plant according to claim 6, wherein the aqueous regeneration solution is a strong acidic solution which has a concentration of $Na^+$ and $Ca^{2+}$ ions of less than 0.5 ppb.

20. The method for identifying the unit causing a raw water leak in a condenser of a thermal power plant according to claim 6, wherein the aqueous regeneration solution is a strong acidic solution which has a concentration of $Na^+$ and $Ca^{2+}$ ions of less than 0.2 ppb.

* * * * *